United States Patent [19]

Maekawa

[11] 4,073,781
[45] Feb. 14, 1978

[54] METHOD OF PRODUCTION OF AZO DYES FROM A QUINONE CONTAINING COMPOUND AND A DIAZONIUM COMPOUND

[75] Inventor: Yukio Maekawa, Minami-ashigara, Japan

[73] Assignee: Fuji Photo Film Co., Ltd., Minami-ashigara, Japan

[21] Appl. No.: 588,438

[22] Filed: June 19, 1975

[30] Foreign Application Priority Data

June 20, 1974 Japan .................................. 49-70668

[51] Int. Cl.$^2$ .................. C07C 107/02; C07C 107/04; C07C 107/08
[52] U.S. Cl. .................................. 260/152; 260/155; 260/156; 260/157; 260/160; 260/162; 260/163; 260/165; 260/176; 260/184; 260/186; 260/187; 260/190; 260/191; 260/192; 260/193; 260/194; 260/195; 260/197; 260/199; 260/200; 260/201; 260/203; 260/204
[58] Field of Search ............... 260/199, 193, 197, 192, 260/152, 156, 200, 204, 160, 162, 163, 176, 195, 194, 203, 190, 165, 186, 155, 157, 201, 184, 187, 191

[56] References Cited

U.S. PATENT DOCUMENTS

3,717,624  2/1973  Buehler et al. .................. 260/193 X

OTHER PUBLICATIONS

Brassard et al., *Can. J. Chem.*, 36, 1346–1349, (1958).
Kehrmann et al., *Ber.*, 30, 2125–2130, (1897).

*Primary Examiner*—Charles F. Warren
*Attorney, Agent, or Firm*—Sughrue, Rothwell, Mion, Zinn and Macpeak

[57] ABSTRACT

A method of preparing an azo dye containing a quinone residue useful as an intermediate for dyes and dye developers suitable for the color diffusion transfer process comprising reacting a quinone residue-containing coupler with a diazonium compound whereby the necessity of protection steps may be avoided.

7 Claims, No Drawings

METHOD OF PRODUCTION OF AZO DYES FROM A QUINONE CONTAINING COMPOUND AND A DIAZONIUM COMPOUND

BACKGROUND OF THE INVENTION

1. Field of the Invention

The present invention relates to a method of preparing azo dyes, and particularly quinone residue-containing azo dyes.

An azo dye containing a quinone residue in the molecule can be effectively used as an intermediate of a certain kind of dye and a dye developer for the color diffusion transfer process.

2. Description of the Prior Art

In the art of producing azo dyes, known methods are described in, e.g., U.S. Pat. Nos. 3,086,005, 3,222,169 and 3,307,947. These methods contain the following steps:

a. diazotization of an amine having a hydroquinone residue protected by an acetyl group, that is, a diacetoxy benzene residue, b. an azo coupling reaction of the resulting diazotized amine, c. removal of the acetyl group by hydrolysis to form the azo dye containing a hydroquinone residue, and d. oxidation of the above product to form an azo dye containing a quinone residue.

The above methods, however, possess the following technical disadvantages.

1. An amine having a hydroquinone residue must be acetylated in order to protect the hydroxyl groups of the hydroquinone moiety which may be subjected to oxidation. In addition, the above acetylation reaction must be carried out with greatest care because the amino group must be protected from acetylation.

2. Removal of the acetyl group must be carried out. This reaction must also be achieved carefully because hydroquinone is particularly unstable in an alkaline solution.

3. The amine used in the above methods is converted to an azo dye, to begin with. Then, the resulting azo dye is subjected to both the removal of the acetyl group and an oxidation. Since such an azo dye usually has a lower solubility than the amine which is used as a starting material, because the azo dye has a higher molecular weight, only a few solvents can be used for the synthesis and purification according to the above procedures, and, use of a large amount of solvent, may be required.

SUMMARY OF THE INVENTION

Therefore, an object of the present invention is to provide a new method of producing azo dyes as an intermediate for a dye developing agent which is useful in the color diffusion transfer process.

Another object of the present invention is to provide a method for producing quinone residue-containing azo dyes which comprises a one-step reaction and in which the azo dyes are synthesized by reaction of couplers containing quinone residues with diazonium compounds.

A further object of the present invention is to provide a general synthetic method wherein it is possible for the structure of a dye developing agent to be previously modified with ease when various properties of the dye developing agent, such as color tone, solubility, transfer efficiency, etc., can be controlled by the modification of the chemical structure thereof.

These and other objects of the present invention will become apparent from the following disclosure, The above-described objects are attained by the process of this invention comprising reacting a coupler having a quinone residue with a diazonium compound.

DETAILED DESCRIPTION OF THE INVENTION

Namely, azo dyes having quinone residues produced in the present invention can be prepared by the reaction of quinone residue-containing couplers with diazonium compounds. More specifically, azo dyes having quinone residues can be prepared as follows. A quinone residue-containing coupler is at first prepared, the hydroquinone residue thereof is then oxidized without the hydroxyl group being protected by acetyl groups to produce a quinone residue, and the resultant product is, then, subjected to a diazo coupling reaction.

It is already known that a quinone nucleus and a diazonium ion undergo an intermolecular reaction to form a combination, for example, as described in G.R. Reynolds and J.A. Van Allan, *Org. Synth. Coll.* Vol. 4, 15, John Wiley & Sons, Inc., New York. Therefore, in the reaction of a quinone residue-containing coupler with a diazonium compound the formation of an azo dye attributable to diazo coupling and the above-described quinone nucleus reaction will take place at the same time. Consequently, it would be expected that it would be difficult to produce a quinone residue-containing azo dye of high purity in high yield.

However, it was, in fact, confirmed that 2-p-acetylphenylquinone was obtained in 96 ~ 98% yield when para-benzoquinone alone was allowed to react with p-acetylbenzene diazonium.

Thus, in accordance with an embodiment of the present invention, it was found that quinone residue-containing azo dyes of high purity can be prepared in high yield because only a diazo coupling reaction with the couplers took place preferentially when quinone residue-containing couplers were allowed to react with diazonium compounds. Such a result, although it might have occurred through the overwhelmingly rapid diazo coupling reaction, compared with the reaction with a quinone moiety, was quite an unexpected phenomenon.

The advantage of this phenomenon has important industrial implications from the standpoint of production of quinone residue-containing azo dyes with high purity and in high yield by conducting a diazo coupling reaction.

Couplers which can be employed in the present invention can be synthesized according to the following general methods wherein:

1. Amino group-containing hydroquinones are reacted with couplers containing a carboxylic acid chloride group, (The reaction of amines with carboxylic acid chlorides is a very common reaction, and is described in mmany scientific references and literature, e.g., Romeo B. Wagner and Harry D. Zook, *Synthetic Organic Chemistry*, pp. 566 ~ 567, John Wiley & Sons, New York, (1961). Amino group-containing hydroquinones are conventionally well known, and are described, for example, in U.S. Pat. Nos. 3,019,107, 3,236,893 and 3,307,947.), 2. Amino group-containing hydroquinones are reacted with couplers containing a sulfonic acid chloride group, 3. Under the same conditions as those described in U.S. Pat. Nos. 3,246,016, 3,245,790 and 3,288,788, hydroquinones containing homogentisic acid lactones or carboxylic acid chloride groups (wherein hydroxyl groups are protected by acylation or reaction with alkyl chloroformate) are reacted with amino group-containing couplers, and 4. As described in U.S. Pat. No. 3,252,990, hydroquinones containing amino groups which can be diazotized (the hydroxyl groups of which are protected by acylation or by reaction with alkyl chloroformate) are diazotized, reacted with substituted esters of succinic acid, and then, the protecting groups are removed from the hydroquinone moiety.

Quinone residue-containing couplers which can be employed in the present invention can be produced by oxidation of hydroquinone-containing couplers which are prepared according to the above-described methods with an oxidizing agent.

As examples of oxidizing agents which can be used herein, all oxidizing agents which are known to be effective for hydroquinones, for example, as described in Nobuhito Ota, Hiroshi Otsuki and Takeo Sakan, *Lectures on Experimental Chemistry*, Vol. 17, pp. 17 ~ 597, Maruzen Co., Ltd., Tokyo, (1957), e.g., halic acids such as chloric acid, bromic acid and iodic acid, perhalic acids such as perchloric acid, hypohalic acids such as hypochloric acid, inorganic oxidizing agents such as nitric acid, chromic acid, manganese dioxide, ferric chloride and so on. In addition, organic oxidizing agents such as quinones can also be used.

Specific examples of the coupler moiety of the quinone residue-containing coupler which can be effectively employed in the present invention include, for example, phenols, naphthols and aromatic amines (e.g., phenol, naphthol, aniline, naphthylamine and the substituted derivatives thereof), which each have free ortho-positions or para-positions to the amino groups thereof (i.e., no atoms or groups except for hydrogen are in the ortho or para positions to the amino groups), hydroxy group-containing heterocyclic aromatic compounds (e.g., pyrazolone, indoxyl, thioindoxyl compounds and the derivatives thereof), aliphatic or alicyclic active methylene couplers, that is, aliphatic or alicyclic methylene group-containing compounds which are activated by two adjacent keto, aldehyde, ester or nitrile groups, which can be the same or different, (e.g., 1,3-diketones, α-keto aryl amides and the derivatives thereof) and so on.

Specific examples of appropriate substituted groups which can be present in the above-described substituted derivatives include an alkyl group (preferably containing from 1 to 6 carbon atoms, e.g., methyl, ethyl, isopropyl, tert-butyl, pentyl, hexyl, etc.) a sulfo group, an alkoxy group (preferably containing from 1 to 6 carbon atoms, e.g., containing the above-described alkyl groups as the alkyl moieties thereof), an aryl group (a monocyclic or condensed polycyclic aromatic group, e.g., a phenyl group, a napthyl group and the like), an aryloxy group (the aryl moiety of which is preferably the same as the above-described aryl groups), an amino group, a carboxyl group, an alkylamino group (preferably having from 1 to 6 carbon atoms in the alkyl moiety thereof, e.g., containing the above-described alkyl groups as the alkyl moieties thereof), an arylamino group (wherein the aryl moiety is the same as the above-described aryl groups), a hydroxyl group, a cyano group, an acylamino group (preferably having from 1 to 6 carbon atoms in the acyl moiety), an alkylsulfonamido group (preferably containing from 1 to 6 carbon atoms in the alkyl moiety, e.g., containing the above-described alkyl groups as the alkyl moieties thereof) and halogen atoms (preferably chlorine and bromine atoms).

The selection of appropriate substituted groups from the above-described groups, and to which positions these substituted groups are attached, and how many positions are substituted by these groups are determined by considering the effects of the substituents upon color tone, solubility, lightstability and transfer properties of the compound.

A preferred group of quinone residue-containing couplers which can be advantageously used in the present invention has the following general formula (I):

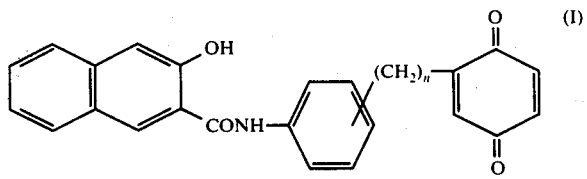

wherein n represents 1 or 2.

Particularly preferred compounds of the above general formula (I) are specifically illustrated as follows:

Compound (1)

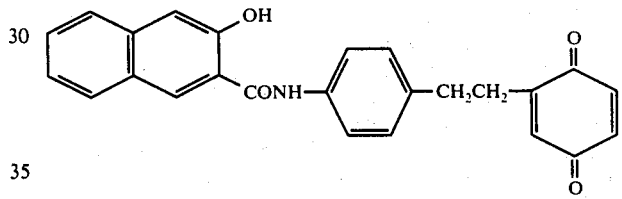

Compound (2)

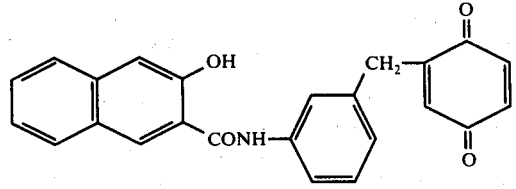

Another useful group of quinone residue-containing couplers has the following general formula (II):

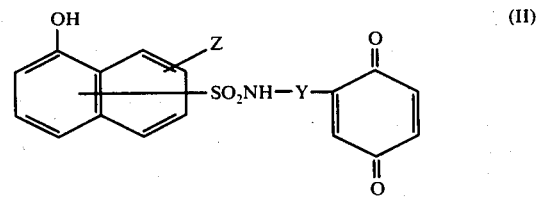

wherein Y represents a divalent group such as methylene, ethylene,

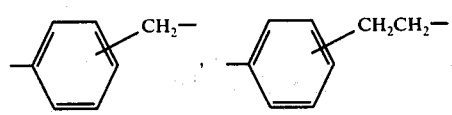

etc., and Z represents an acylamino group (e.g., acetylamino, benzoylamino and so on), and which includes the following preferred specific compounds:

Compound (3)
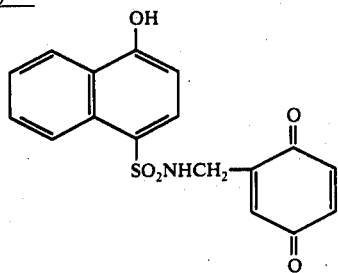

Compound (4)
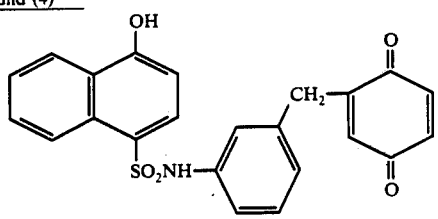

Compound (5)
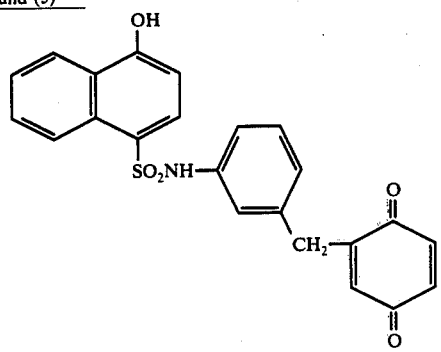

Compound (6)
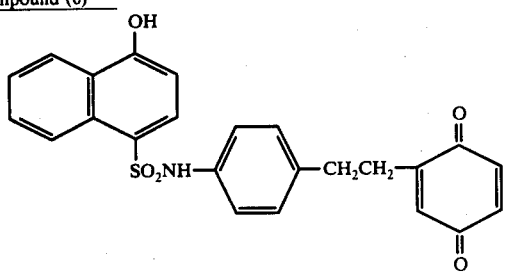

Compound (7)

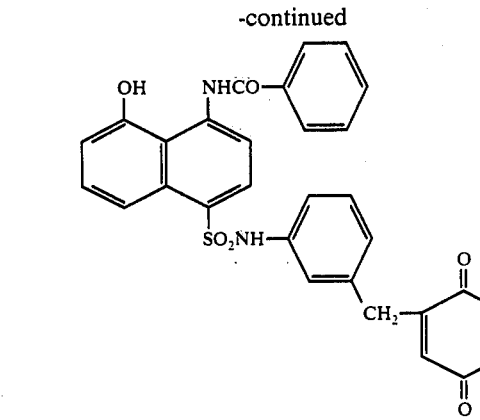

Compound (8)
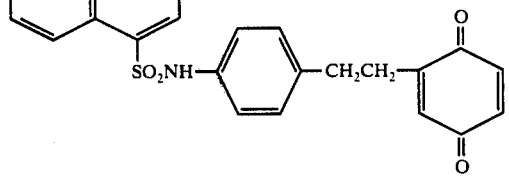

A further useful group of quinone-residue-containing couplers has the following general formula (III):

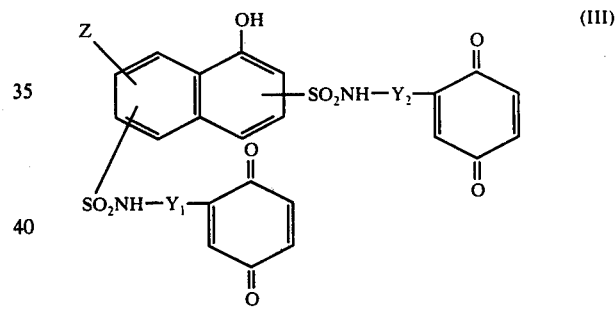

wherein $Y_1$ and $Y_2$ each represents the same groups as Y in the general formula (II), and Z represents the same group as in the general formula (II), and which includes the following preferred specific compound:

Compound (9)
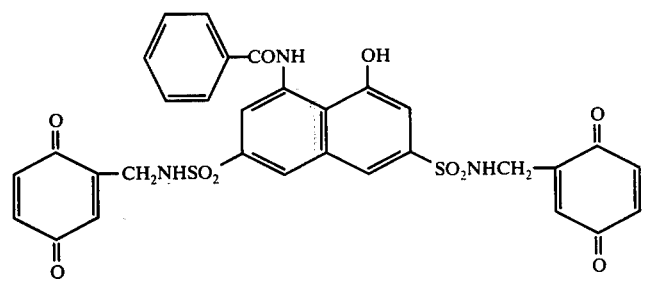

Still another useful group of quinone residue-containing couplers has the following general formula (IV):

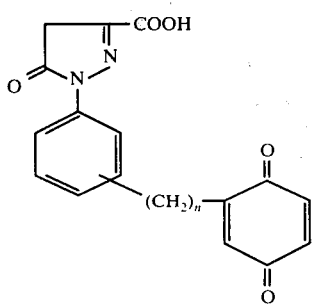

wherein n represents 1 or 2.

Particularly advantageous compounds which are included in the above general formula (IV) are specifically shown below:

Compound (10)

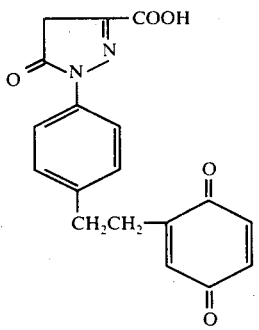

Compound (11)

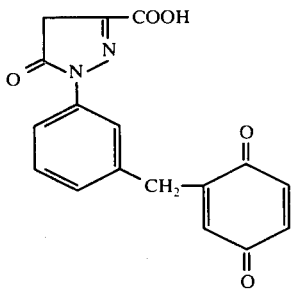

Another preferred group of quinone residue-containing couplers has the following general formula (V):

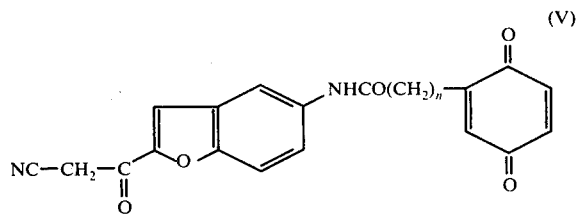

wherein n represents 1 or 2.

A specific example of a compound represented by the above general formula (V), which is particularly preferred for use herein, is:

Compound (12)

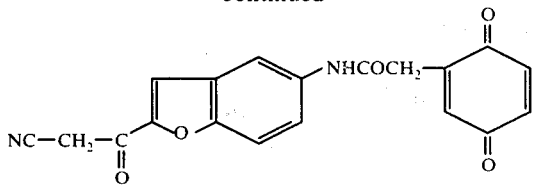

A further preferred group of quinone-residue-containing couplers has the following general formula (VI):

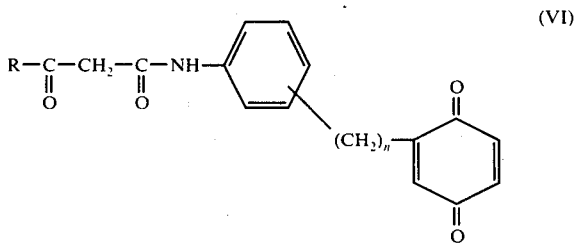

wherein R represents a lower alkyl group containing from 1 to 6 carbon atoms (e.g., as described hereinbefore) or a phenyl group, and n represents 1 or 2.

Specific examples of compounds represented by the above general formula (VI), which are particularly preferred for use herein, are as follows:

Compound (13)

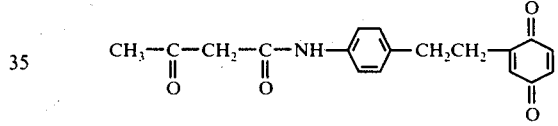

Compound (14)

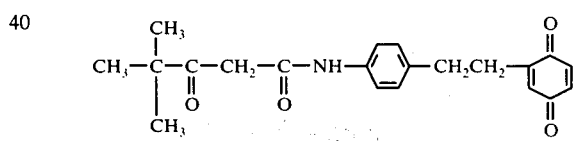

Compound (15)

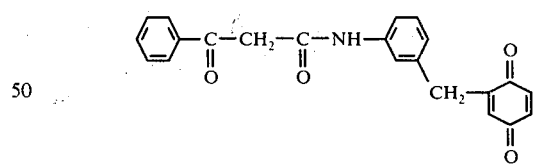

Still another preferred group of quinone residue-containing couplers has the following general formula (VII):

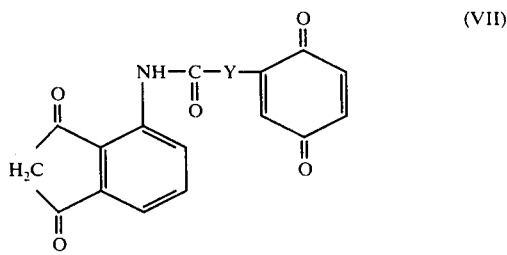

wherein Y represents the same groups as described in the general formula (II).

A specific example of the compounds represented by the above general formula (VII), which are particularly preferred for use herein, is the following compound:

Compound (16)

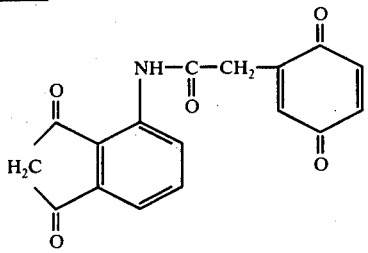

Another preferred group of quinone residue-containing couplers has the following general formula (VIII):

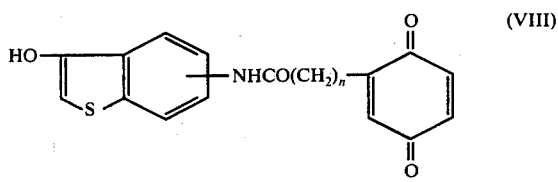

wherein n represents 1 or 2, and which includes particularly advantageous Compound (17) and Compound (18):

Compound (17)

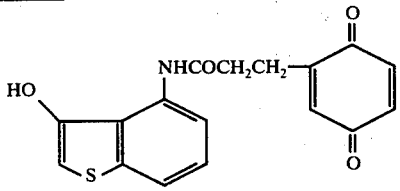

Compound (18)

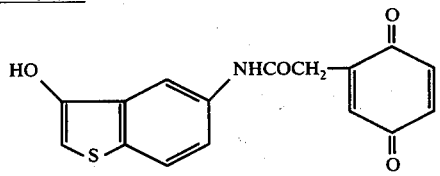

Another preferred group of quinone residue-containing couplers has the following general formula (IX):

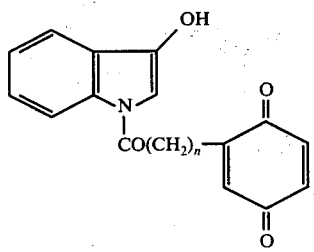

wherein n represents 1 or 2, and which includes particularly useful Compound (19):

Compound (19)

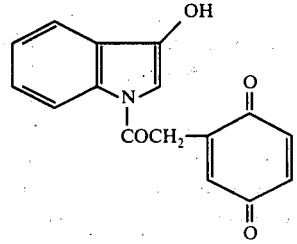

On the other hand, diazonium compounds can be synthesized by diazotizing aromatic primary amines.

Diazonium compounds can be obtained by carrying out the diazotization reaction according to a conventional manner. Detailed descriptions of diazotization reactions are given, for example, in Yutaka Hosoda, *Chemistry of New Dyes,* Gihode, Tokyo, (1971), and Hiroshi Horiguichi, *Synthetic Dyes, Sankyo Publishers, Tokyo,* (1968). The diazonium compounds can be obtained by, for example, the following procedures of: acidifying a solution of one mole of an aromatic primary amine or ammonium salt with an acid such as hydrochloric acid, acetic acid, etc., to a pH less than about 5, chilling the resulting solution to a temperature of about 15° C to −15° C, preferably below 3° C, and adding dropwise one mole or more of a solution of (e.g., a molar ratio of about 1:1 to 1:1.5) a nitrite (e.g., a sodium nitrite) to the above chilled solution. Suitable solvents which can be used to prepare the above solutions include water, acetic acid, propionic acid, etc.

Diazonium compounds include mono- and polycyclic aromatic diazonium compounds, heterocyclic aromatic diazonium compounds and the substituted derivatives thereof (e.g., benzene, naphthalene, pyridine an triazole diazonium compounds).

Specific examples of substituted groups which can be present in the above substituted derivatives of diazonium compounds include an alkyl group (preferably having from 1 to 6 carbon atoms, e.g., as hereinbefore described), a sulfo group, an alkoxy group (preferably having from 1 to 6 carbon atoms, e.g., as hereinbefore described), an aryl group (e.g., a monocyclic and a condensed poly-cyclic aromatic group such as a phenyl group, a naphthyl group, etc.), an aryloxy group (the aryl moiety of which preferably is the same as the above-described aryl groups), a carboxyl group, an alkylamino group (preferably containing from 1 to 6 carbon atoms in the alkyl moiety thereof, e.g., as hereinbefore described), an arylamino group (the aryl moiety of which preferably is the same as the above-described aryl groups), a hydroxy group, a cyano group, an acylamino group (having from 1 to 6 carbon atoms in the acyl moiety thereof, e.g., as hereinbefore described), an alkylsulfonamido group (preferably having from 1 to 6 carbon atoms in the alkyl moiety thereof, e.g., as hereinbefore described), a halogen atom (preferably chlorine and bromine atoms), a nitro group and so on.

The selection of the appropriate substituent, substituent position, and number of substituted groups should be made by considering the color tone, the solubility, the light-stability and the transfer efficiency of the dye developers which will be obtained when the compounds prepared in the present invention are reduced.

Moreover, these diazonium compounds themselves can also be azo dyes.

Preferred diazonium compounds which can be employed in the practice of the present invention include benzene diazonium compounds, naphthalene diazonium compounds and heterocyclic diazonium compounds represented by the following formulae, wherein although the anion in these examples is shown to be a chlorine ion or acetate ion, the anion is not restricted to the above two specific ions because the anion can be altered by the specific acids used.

Compound (20)

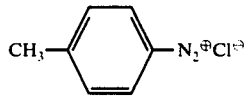

Compound (21)

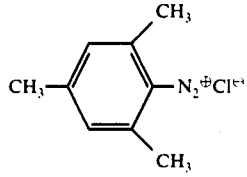

Compound (22)

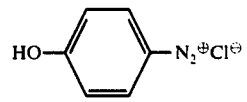

Compound (23)

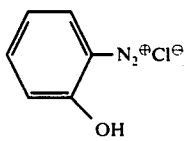

Compound (24)

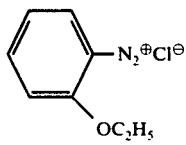

Compound (25)

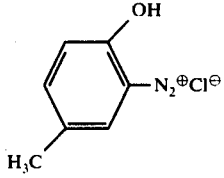

Compound (26)

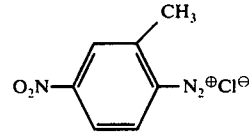

Compound (27)

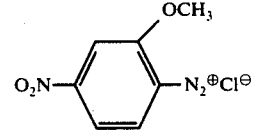

Compound (28)

-continued

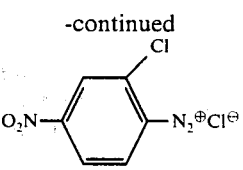

Compound (29)

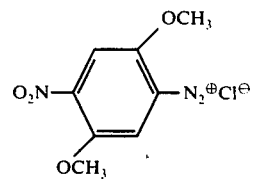

Compound (30)

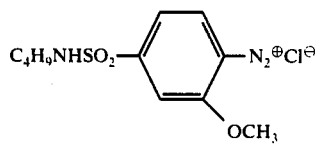

Compound (31)

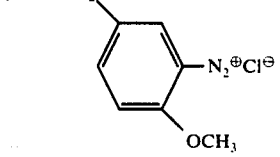

Compound (32)

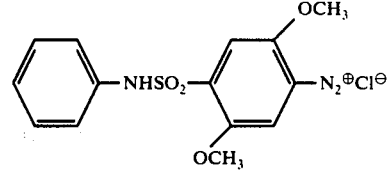

Compound (33)

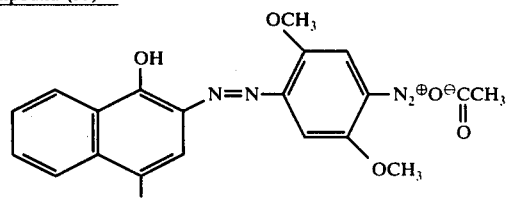

Compound (34)

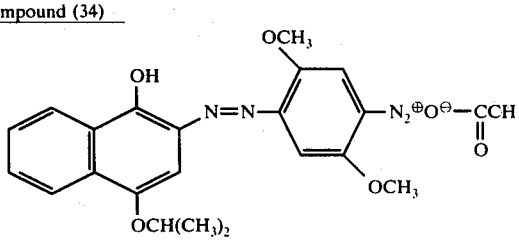

Compound (35)

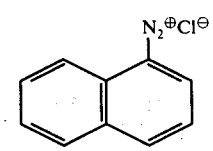

Compound (36)

Compound (37)
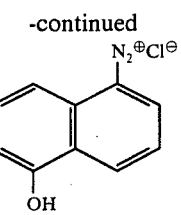

Compound (38)
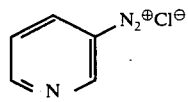

Compound (39)
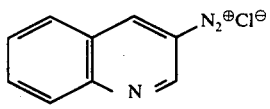

The diazo coupling reaction of quinone residue-containing couplers with diazonium compounds was not known until now. It is surprising that the desired quinone residue-containing azo dye could be prepared when a diazo coupling reaction was attempted under well known conditions suitable for a conventional diazotization as described in, for example, *Chemistry of New Dyes and Synthetic Dyes*, supra, and Ryohei Oda, *Lecture on Experimental Chemistry*, Vol. 20, Maruzen Co., Ltd., Tokyo, (1957).

Namely, the following various conditions will be optionally required when they are allowed to react with each other:

1. The quantity of the diazonium compound added to the quinone residue-containing coupler should range from about 0.1 to 10 molar equivalents, and preferably from 0.5 to 1.5 molar equivalents, to the diazonium compound.
2. Suitable temperatures for carrying out the reaction should range from about 31 5° C to +15° C., and preferably from 0° C to 5° C.
3. The effective pH range for conducting the reaction should be lower than about 9, and preferably a pH of from 5 to 7.
4. The reaction should be carried out with vigorous stirring.

An appropriate medium for the reaction can be selected by taking into account the reaction conditions, the boiling point, the melting point, the solubility, the reactivity, the odor and the price thereof and suitable media include water, alcohols (e.g., methanol, ethanol, isopropanol, etc.), organic acids (e.g., acetic acid, propionic acid, etc.), organic bases (e.g., pyridine, quinoline, etc.), dialkylamides (e.g., dimethylformamide, dimethylacetoamide, etc.), dialkyl sulfoxides (e.g., dimethyl sulfoxide, etc.), N-alkyllactams (e.g., N-methylpyrrolidone, etc.), acetonitrile, acetone and the like. The above-described solvents can be used individually or in combination.

For the purpose of adjustment of the reaction system to the proper pH, a pH moderator can be selected from the salts of weak acids (e.g., sodium acetate, sodium bicarbonate, sodium carbonate, potassium carbonate, etc.), organic bases (e.g., pyridine, etc.), organic acids (e.g., acetic acid, etc.), inorganic bases (e.g., sodium hydroxide, potassium hydroxide, etc.), inorganic acids (e.g., hydrochloric acid, sulfuric acid, etc.) and the like, and which can be employed individually or in combination.

In addition, urea or sulfamic acid can be added to further accelerate the diazo coupling reaction, for these materials can decompose excess nitrous acid in the diazo solution.

An especially useful class of azo dyes which can be synthesized according to the method of the present invention has the following general formula (X):

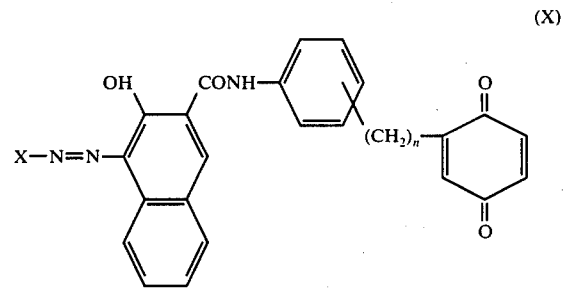
(X)

wherein $n$ represents 1 or 2, and X represents an aryl group (e.g., phenyl, tolyl, mesityl, 2-methoxy-4-nitrophenyl, naphthyl, etc.), or an aromatic heterocyclic group (e.g., pyridyl, quinolyl, etc.).

Specific examples of the compounds having the above general formula (X) are illustrated below:

Compound (40)

Compound (41)
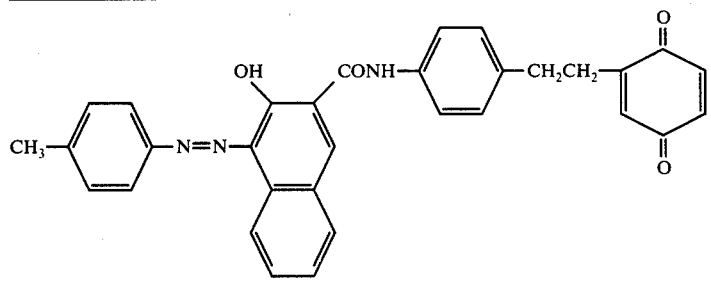

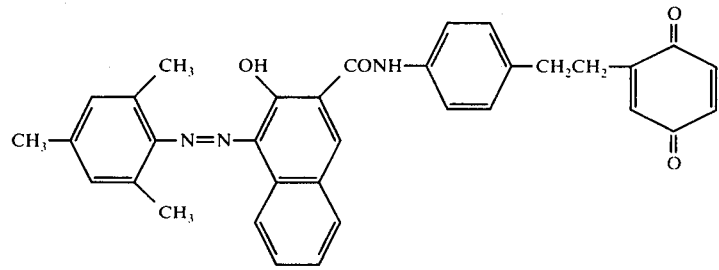

Compound (42)

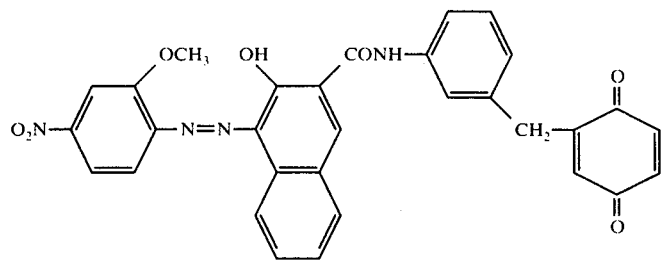

Another useful class of azo dyes has the following general formula (XI):

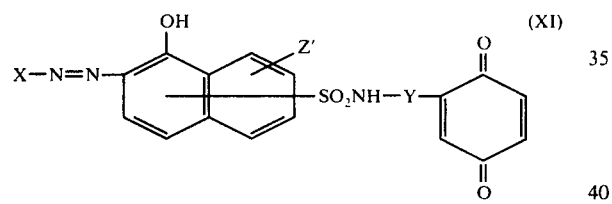

wherein Y represents a methylene group, an ethylene group,

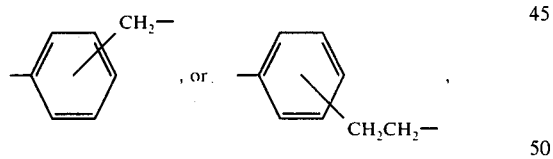

Z' represents hydrogen or an acylamino group (e.g., acetylamino, benzoylamino, etc.), and X represents the same groups as in the general formula (X).

Specific examples of compounds of the above general formula (XI) are as follows:

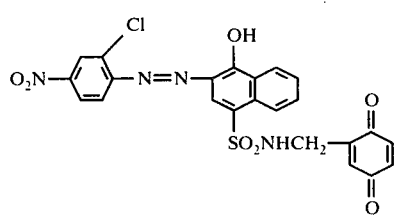

Compound (43)

Compound (44)

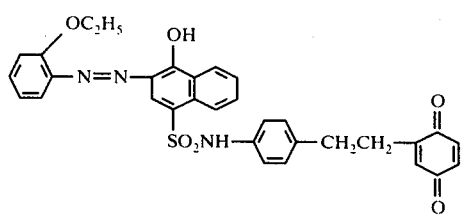

Compound (45)

Compound (46)

Compound (47)

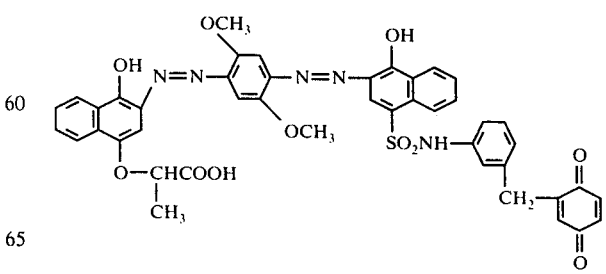

Compound (48)

-continued

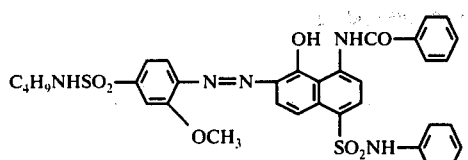

Compound (49)

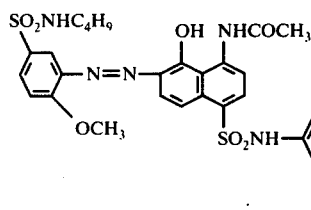

A further useful class of azo dyes has the following general formula (XII):

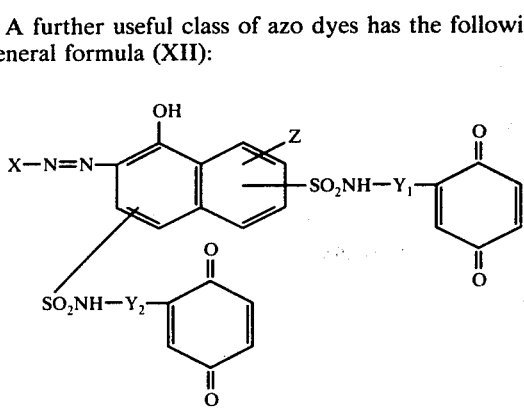

wherein $Y_1$ and $Y_2$ each represents the same groups as Y in the general formula (XI), Z represents an acylamino group (e.g., acetylamino, benzoilamino, etc.), and X represents the same groups as in the general formula (X).

A specific example of a compound having the general formula (XII) is illustrated below:

Compound (50)

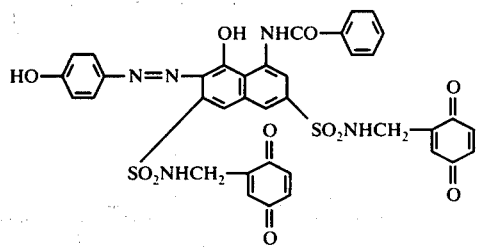

Still another useful class of azo dyes has the following general formula (XIII):

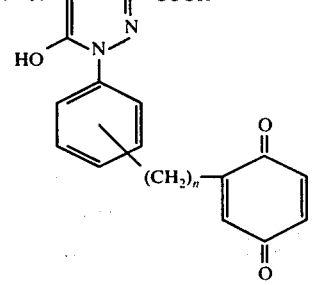
(XIII)

wherein $n$ represents 1 or 2, and X represents the same groups as in the general formula (X).

Specific examples of compounds of the above general formula (XIII) are as follows:

Compound (51)

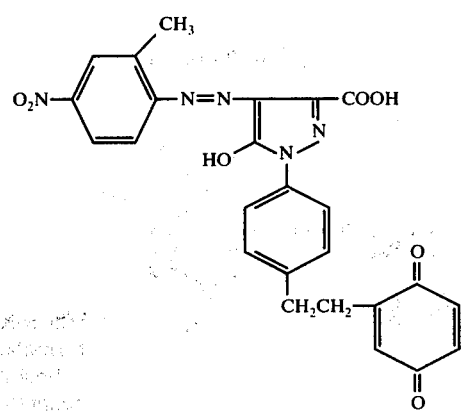

Compound (52)
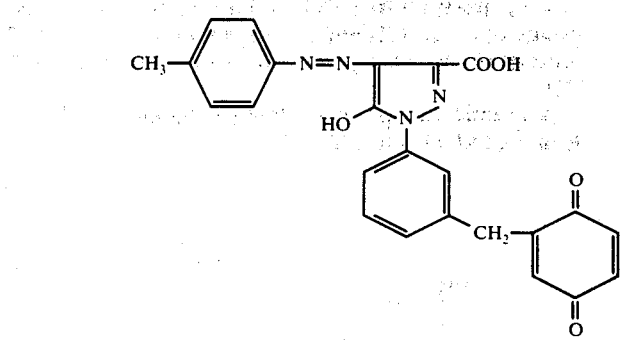
Compound (53)
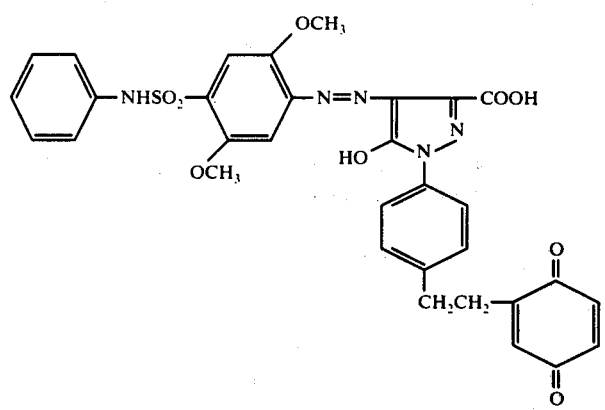
Compound (54)
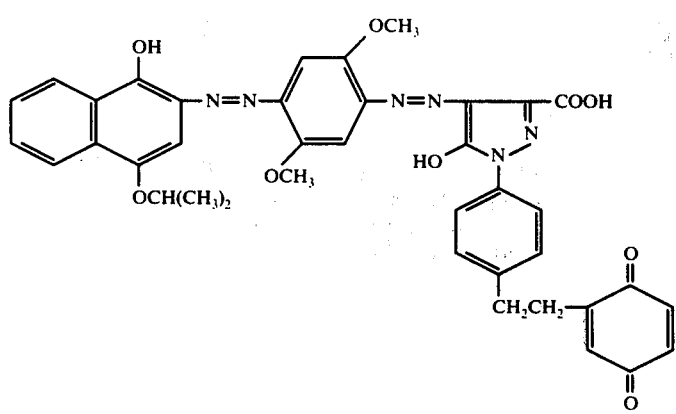
Another useful class of azo dyes has the following general formula (XIV):
(XIV)
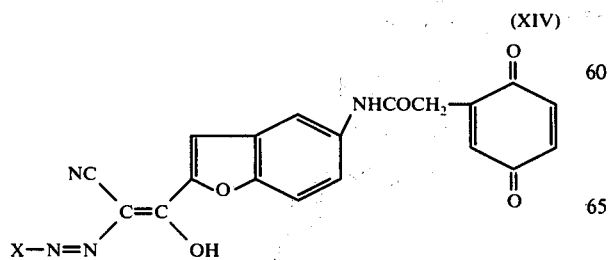
wherein X represents the same groups as in the general formula (X).
Specific examples of the compounds of the above general formula (XIV) are as follows:

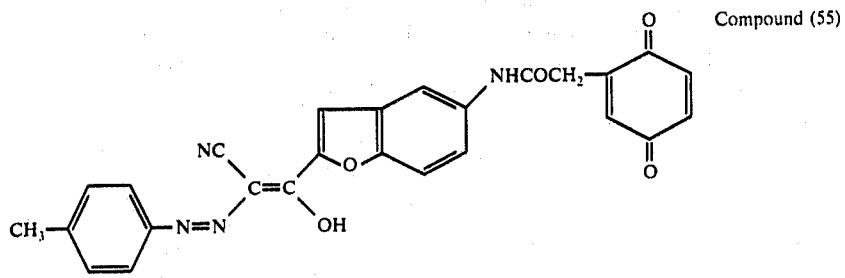

Compound (55)

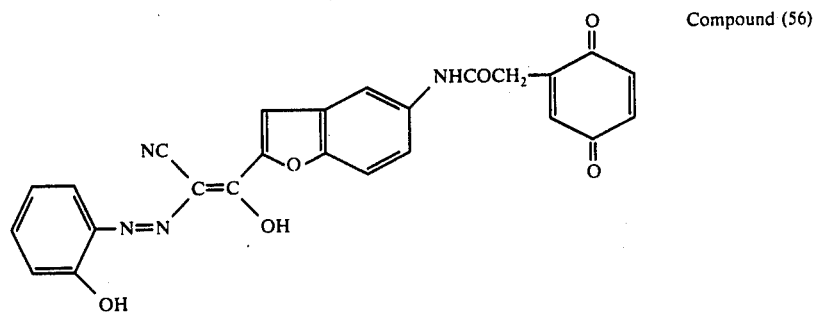

Compound (56)

A further useful class of azo dyes has the following general formula (XV):

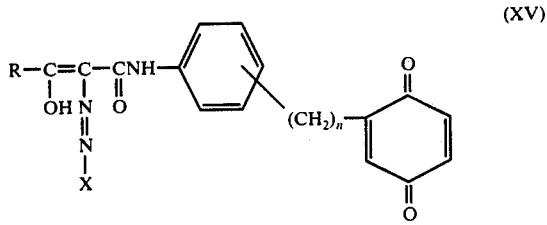
(XV)

wherein R represents a lower alkyl group containing from 1 to 6 carbon atoms (e.g., as hereinbefore described) or a phenyl group, X represents the same groups as in the general formula (X), and n represents 1 or 2.

Specific examples of compounds of the above general formula (XV) are as follows:

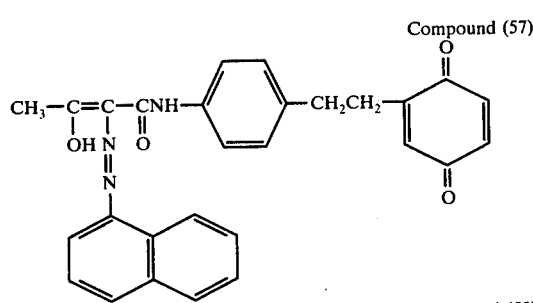

Compound (57)

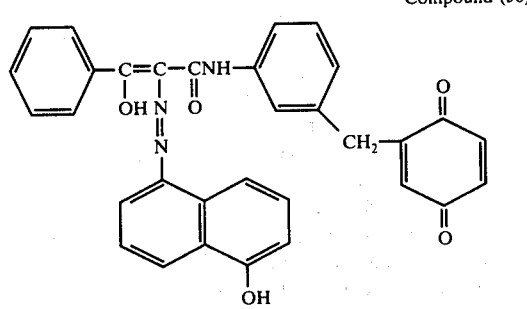

Compound (58)

Still another useful class of azo dyes has the following general formula (XVI):

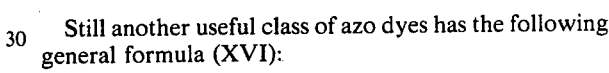
(XVI)

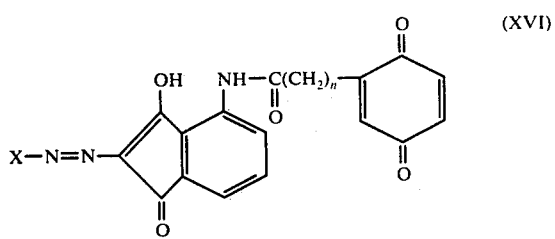

wherein n represents 1 or 2, and X represents the same groups as in the general formula (X).

Specific examples of compounds of the above general formula (XVI) are as follows:

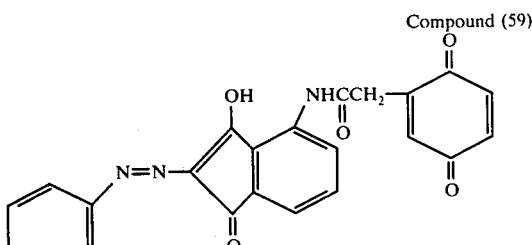

Compound (59)

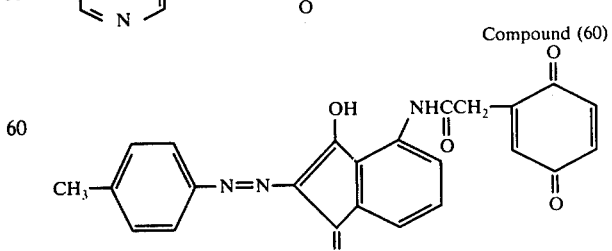

Compound (60)

Another useful class of azo dyes has the following general formula (XVII):

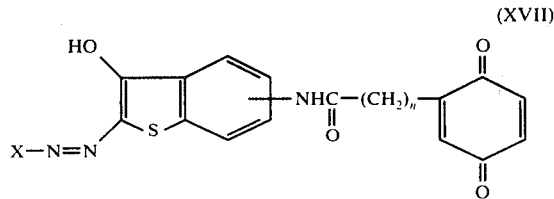

(XVII)

wherein *n* represents 1 or 2, and X represents the same groups as in the general formula (X).

Specific examples of the compounds of the above general formula (XVII) are illustrated below:

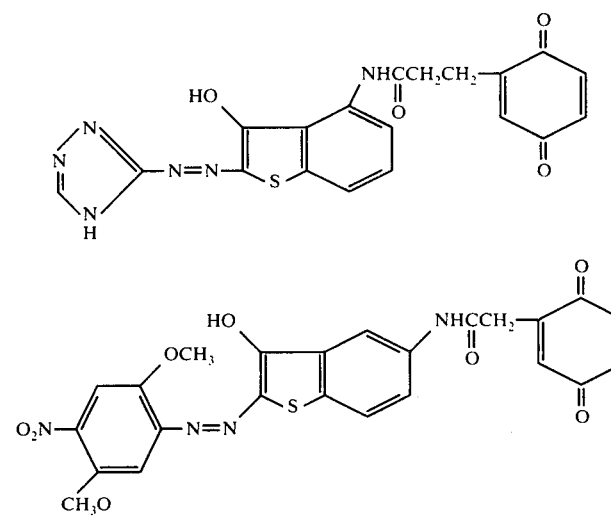

Compound (61)

Compound (62)

A further useful class of azo dyes has the following general formula (XVIII):

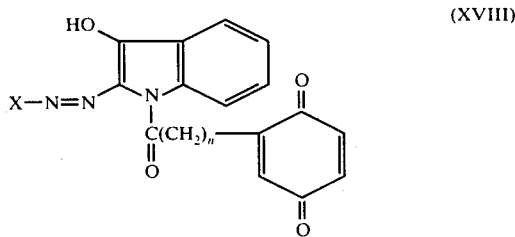

(XVIII)

wherein *n* represents 1 or 2, and X represents the same groups as in the general formula (X).

A specific example of a compound of the above general formula (XVIII) is illustrated below:

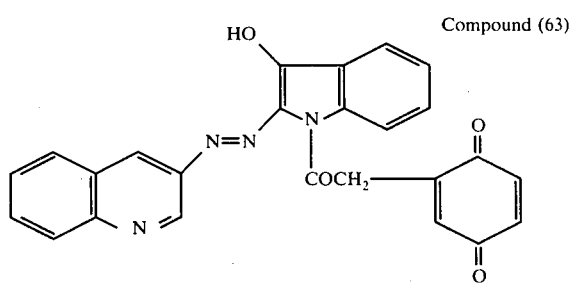

Compound (63)

In accordance with an embodiment of the present invention, azo dyes containing quinone residues are provided which are employed as dyes, intermediates of dyes or intermediates of dye-developers. From the azo dyes obtained in the present invention dye-developers quite suitable for color diffusion transfer photography can be produced, for example, by the addition of hydrogen in presence of an appropriate catalyst such as palladium-carbon as described in U.S. Pat. Nos. 3,006,005 and 3,307,947, by reduction with hydroquinones substituted in the 2-position such as p-xylohydroquinone, or by reduction with compounds such as diethylhydroxylamine as described in Japanese Patent Application No. 32,838/73.

Moreover, these quinone residue-containing azo dyes are especially excellent when used for the purposes as described in U.S. Pat. Nos. 3,086,005, 3,307,943, 3,579,334, 3,006,005, 3,307,947, 3,086,005, and Japanese Patent Application No. 76,226/73.

In accordance with the present invention, preferred effects and advantages have been found, some of which are summarized below.

Firstly, a reduction in the number of steps in the synthesis is possible. Namely, the three steps of preparing a coupler containing a hydroquinone residue, oxidizing the hydroquinone moiety, and carrying out a diazo coupling reaction are required in the present invention, compared with four steps using a conventional process which include the steps of protecting the hydroxyl group, which tend to be oxidized, from oxidation with the aid of an acetyl group, conducting a diazo coupling reaction, regenerating the hydroquinone by hydrolysis, and oxidizing the resulting hydroquinone.

Secondly, the conversion to azo dyes is quite disadvantageous from the standpoint of efficiency because the decrease in solubility which occurs when the molecular weight becomes large restricts the selection of usable solvents to a narrow range, and thus, require a large amount of solvent when these compounds are synthesized and purified. In the conventional processes, the two steps of hydrolysis and oxidation were required after preparing such azo dyes. On the other hand, the diazo coupling step for preparation of the azo dyes is the final step in the present invention. Therefore, suitable solvent for synthesis and purification can be selected from a broad range of solvents and a small amount of such a solvent will suffice, and the procedures for synthesis and purification also become easy in the present invention.

Thirdly, it is possible to choose the solvent to be used herein by taking prevention of various types of pollution such as odor and toxicity, disposal of waste water, etc., into consideration since the method of the present invention makes it possible for the solvents used to be selected from a broad range of solvents.

Fourthly, a wide variety of azo dyes having different characteristics from each other can be easily prepared according to the method of the present invention because the coupler containing a quinone residue undergoes a diazo coupling reaction therein, compared with the method as described in U.S. Pat. Nos. 3,222,169, and 3,307,947, wherein aromatic amines containing hydroquinone residues which are protected by acetyl groups are diazotized, and then, the resulting product is subjected to a diazo coupling reaction with couplers.

The present invention will be more specifically illustrated by reference to the following detailed examples. Unless otherwise indicated herein, all parts, percents, ratios and the like are by weight.

EXAMPLE 1

Synthesis of Compound (1)

a. Synthesis of 2-Hydroxy-3-[p-(2-hydroquinonylethyl)phenyl]-carbamoylnaphthalene:

50 ml of acetonitrile was added to the mixture of 11.3 g of 2-oxy-3-naphthoic acid chloride with 17 g of 4-(2,5-dihydroxyphenethyl)aniline hydrobromide. The mixture was cooled in an ice bath and kept at a temperature of below 10° C. With stirring, 40 ml of pyridine was added dropwise to the resulting chilled solution over a 5 minute period, followed by stirring for 30 minutes. After warming the solution to room temperature (about 20° ~ 30° C), the solution was further stirred for 3 hours. The, the solution was poured into 300 ml of a 2% dilute hydrochloric acid aqueous solution.

The resulting precipitate was collected by filtration, washed with water, air-dried and recrystallized from acetone. 12 g of the title compound which was white in color and had a melting point of 265° ~ 268° C was obtained.

b. Synthesis of 2-Hydroxy-3-[p-(2-quinonylethyl)-phenyl]-carbamoylnaphthalene (Compound (1)):

300 ml of ethylene chloride and 50 ml of dimethyl formamide were added to 12 g of the compound obtained in the above step (a), and the mixture was stirred at room temperature.

24 g of manganese dioxide was further added to the above mixture, and stirring was continued for a period of 2 hours.

After the manganese dioxide was removed by filtration, the solution was distilled. The distillate was poured into 200 ml of water.

The resulting precipitate was collected by filtration, washed with water, air-dried and recrystallized from ethylene chloride. Then, 10 g of the titled compound which was pale yellow and which had a melting point of 195° ~ 197° C was obtained.

c. Synthesis of Compound (40):

2.4 g of para-toluidine, 6 ml of a 35% hydrochloric acid aqueous solution and 30 ml of water were mixed with complete stirring, and the mixture was cooled to a temperature of 0° ~ 2° C.

23 ml of a 1N sodium nitrite aqueous solution was added dropwise to the above chilled mixture over a 5 minute period, resulting in a diazotization. The reaction system was maintained at a temperature of 0° ~ 4° C, and further stirred for 10 minutes.

Then, the excess nitrous acid was decomposed by the addition of 0.2 g of sulfamic acid.

On the other hand, 9.0 g of Compound (1) prepared in the above step (b) was dissolved in 100 of pyridine. This pyridine solution was cooled to 0° ~ 2° C with stirring. To this chilled pyridine solution, a diazo solution of Compound (20) which had previously been prepared was slowly added dropwise over a 20 minute period. The mixture was maintained at a temperature of 0° ~ 4° C. After stirring was further continued for a period of 3 hours, the resulting mixture was poured into 300 ml of a 2% dilute hydrochloric acid aqueous solution.

The resulting precipitate was washed with 100 ml of a 2% dilute hydrochloric acid aqueous solution, rinsed with water, air-dried and recrystallized from dimethylformamide. Compound (40) having a melting point of 205° ~ 208° C was then obtained. The yield was 8.2 g. The calculated and the found values on elemental analysis were within the usual limits of variation for elemental analysis.

Elemental Analysis:
Calcd. for Compound (40) (%): H 4.86 C 74.57 N 8.16
Found (%): H 4.90 C 74.35 N 8.20.

EXAMPLE 2

Synthesis of Compound (44)

a. Synthesis of 1-Acetoxy-4-(3'-hydroquinonylmethylphenyl)-sulfamoylnaphthalene:

14 g of 1-acetoxynaphthalene-4-sulfochloride was dissolved in 100 ml of acetonitrile, and the mixture was cooled to a temperature of below 10° C. With stirring, 12.8 g of 3-hydroquinonylmethylaniline was added dropwise to the above chilled mixture over a 5 minute period. 10 ml of pyridine was added dropwise to the resulting solution while holding the temperature at below 10° C, followed by stirring for 2 hours. Then, the resulting solution was poured into one liter of a 2% dilute hydrochloric acid aqueous solution.

A tarry material was deposited. The material solidified on storage for about one hour. The solidified precipitate was collected by filtration, washed with water, air-dried and recrystallized from benzene. 20 g of the above-titled compound which was white in color and had a melting point of 162° ~ 165° C was obtained.

b. Synthesis of 4-(3'Hydroquinonylmethylphenyl)sulfamoyl-1-naphthol:

50 ml of ethyl alcohol was added to 11 g of the compound obtained in the above step (a), to which a solution of 7.3 g of potassium hydroxide in 20 ml of water was added dropwise over a period of about 5 minutes under an inert atmosphere, e.g., nitrogen with stirring. The mixture was further stirred for 5 minutes at room temperature under an inert atmosphere, and it was then cooled with ice water, to which 17 ml of a 35% hydrochloric acid aqueous solution was added dropwise over a 10 minute period, followed by stirring for 20 minutes. The resulting solution was poured into about 500 ml of water. A tarry material was, then, deposited. On storage for an hour, the material solidified and then it was washed two times with water.

The precipitate was collected by filtration, washed with water, air-dried and recrystallized from ethyl acetate. 8 g of the above-titled compound which was white in color and which had a melting point of 212° ~ 115° C was obtained.

c. Synthesis of 4-[(3'-Quinonylmethylphenyl)sulfamoyl]-1-naphthol (Compound (4)):

The above-titled compound was prepared from 5 g of the compound obtained in the above step (b), 10 g of manganese dioxde, 100 ml of ethylene chloride and 30 ml of acetone using the same procedures as described in Example 1 (b), and the product was post-treated in the same manner as in Example 1 (b). The product was recrystallized from ethylene chloride. 4 g of the above-titled compound which was a pale yellow color and had a melting point of 143° ~ 148° C was obtained.

d. Synthesis of Compound (44):

Diazotization was carried out in the same manner as in Example 1 (c) using 1.1 g of 2,5-dimethoxy-para-nitroaniline, 3 ml of a 35% hydrochloric acid aqueous solution, 80 ml of water and 11 ml of a 1N aqueous solution of sodium nitrite. The excess nitrous acid was decomposed by the addition of 0.1 g of sulfamic acid. Then, a diazo solution of Compound (29) was prepared. As a result, a diazo coupling reaction of 4.0 of Compound (4) obtained in the above procedure (c) and 50 ml of pyridine occurred. The diazo compound was post-treated in a manner similar to that used in Example 1 (c), and recrystallized from ethylene chloride. Compound (44) having a melting point of 155° ~ 159° C was obtained. The yield was 3.8 g. The calculated and the found values on elemental analysis agreed within the usual limits of variation of elemental anaylsis.

Elemental Analsysis:

Calcd. for Compound (44) (%): C 59.24 H 3.82 N 8.91
Found (%): C 60.55 H 3.93 N 8.87.

EXAMPLE 3

Synthesis of Compound (54)

a. Synthesis of 1-[p-(2-Hydroquinonylethyl)phenyl]-3-carboxy-5-pyrazolone:

23 g of 1-[p-(2',5'-diacetoxyphenethyl)phenyl]-3-ethoxycarbonyl-5-pyrazolone which was prepared on the basis of the description in U.S. Pat. No. 3,252,990, and which was dissolved in 300 ml of ethyl alcohol was hydrolyzed in an aqueous solution of 30 g of potassium hydroxide and 90 ml of water in the same manner as in Example 2 (b). The resulting solution was acidified with 70 ml of a 35% hydrochloric acid aqueous solution, and then, post-treated in a similar manner as in Example 2 (b). The above-titled compound after recrystallization from ethyl acetate had a melting point of 235° ~ 238° C and a brown color. The yield was 14 g.

b. Synthesis of 1-[p-(2-Quinonylethyl)phenyl]-3-carboxy-5-pyrazolone (Compound (10)):

12 g of the above-titled compound which was brown in color and had a melting point of 170° ~ 173° C was prepared from 14 g of the compound synthesized in the above step (a), 28 g of manganese dioxide, 300 ml of ethylene chloride and 100 ml of acetone by repeating the same procedures and then, by carrying out the same post-treatment as in Example 1 (b).

c. Synthesis of 2-(2',5'-Dimethoxy-4'-nitrophenylazo)-4-isopropoxy-1-naphthol:

800 ml of water and 30 ml of a 35% hydrochloric acid aqueous solution were added to 22.4 g of 2,5-dimethoxy-4-nitroaniline, and the mixture was cooled to 0° ~ 5° C with stirring. The diazotization was carried out by the addition of 7 g of sodium nitrite dissolved in 80 ml of water to the above chilled solution. Slow stirring was continued for a period of 10 minutes after the above addition.

Then, the resulting solution was neutralized to a pH of 6 with sodium acetate. A solution of Compound (29) which was cooled in an ice bath was prepared from the above neutralized solution according to the method as described in U.S. Pat. No. 3,022,354. The solution was added dropwise to a solution of 18.2 g of 4'-isopropoxy-1-naphthol and 400 ml of ethyl alcohol. Mild stirring was continued for a period of one hour at a temperature of below 5° C. Then, crystals separated out. The crystals were collected by filtration, washed thoroughly with water, and air-dried. The resulting crystals were dissolved in 300 ml of benzene, and 200 ml of methyl alcohol was added thereto. After cooling, dark violet needles corresponding to the above-titled compound separated out. The melting point was 245° ~ 249° C, and the yield was 25 g.

d. Synthesis of 2-(2',5'-Dimethoxy-4'-aminophenylazo)-4-isopropoxy-1-naphthol:

400 ml of ethyl alcohol was added to the compound prepared in the above procedure (c) and the solution was warmed to 50° C with mild stirring.

On holding the temperature at 50° C, a solution of 38.4 g of sodium sulfide nonahydrate and 200 ml of water was added dropwise to the above solution over a 20 minute period. The resulting solution was further stirred for 1.5 hours. One liter of water was added thereto to result in the separation of crystals. The crystals were collected by filtration, washed thoroughly with water, and air-dried. Recrystallization was carried out with 400 ml of ethyl acetate. Yellowish green glossy flocculent crystals of the above-titled compound were obtained. The melting point was 186° ~ 187° C, and the yield was 14 g.

e. Synthesis of Compound (54):

12 of the compound prepared in the above step (d) was dissolved in 150 ml of glacial acetic acid, and chilled at a temperature of about 10° C. The compound was diazotized with 32 ml of a 1N sodium nitrite aqueous solution. The resulting excess nitrous acid was decomposed by the addition of 0.2 g of sulfamic acid.

Independently, 10.7 g of Compound (10) prepared in the above step (b) was dissolved in a mixture of 200 ml of acetone and 500 ml of ethyl alcohol, and cooled to a temperature of below 5° C. With stirring, the diazo solution of Compound (34) prepared previously was added dropwise to the above chilled solution over a 20 minute period. At the conclusion of the addition, a sufficient amount of sodium acetate to adjust to a pH of about 7 was added thereto.

Stirring was continued for a period of 2 hours at a temperature of below 5° C, resulting in the separation of crystals. The crystals were collected by filtration and washed thoroughly with water. The crystals were further washed four times with about 250 ml each time of methyl alcohol, and dried. Recrystallization was carried out from 100 ml of dimethylformamide. Then, yellowish green glossy flocculent crystals of the above titled compound was obtained. The melting point was 235° ~ 240° C, and the yield was 15 g.

The calculated and the found values of elemental analysis agreed within the usual limit of variation for elemental analysis.

Elemental Analysis:

Calcd. for Compound (54) (%): C 64.11 H 4.66 N 11.51 Found (%): C 64.84 H 4.78 N 10.65.

While the invention has been described in detail and with reference to specific embodiments thereof, it will be apparent to one skilled in the art that various changes and modifications can be made therein without departing from the spirit and scope thereof.

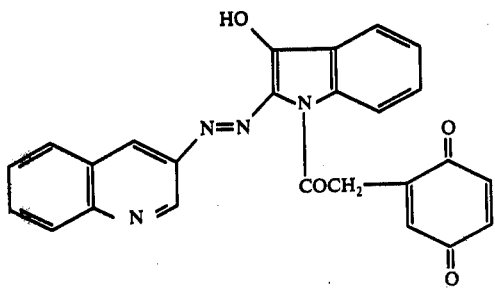

What is claimed is:

1. A method for preparation an azo dye containing a quinone residue comprising reacting a p-quinone residue-containing coupler with a diazonium compound, the reaction taking place preferentially at a position other than at the p-quinone nucleus, to produce an azo dye containing a quinone residue selected from the following general formulae:

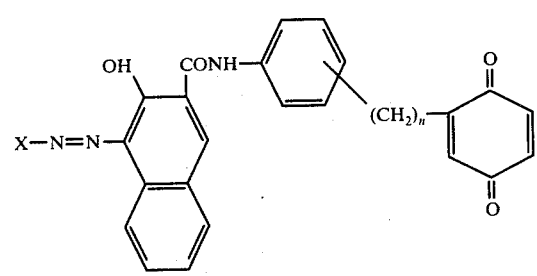

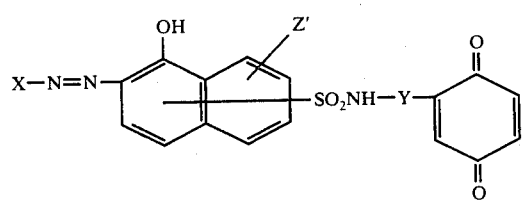

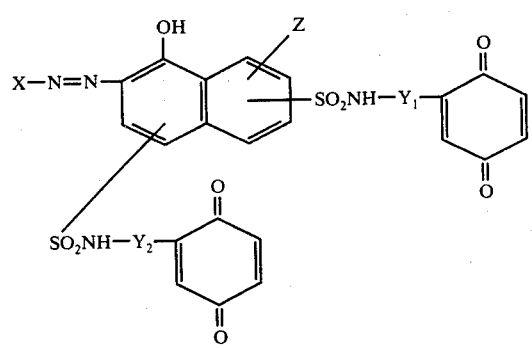

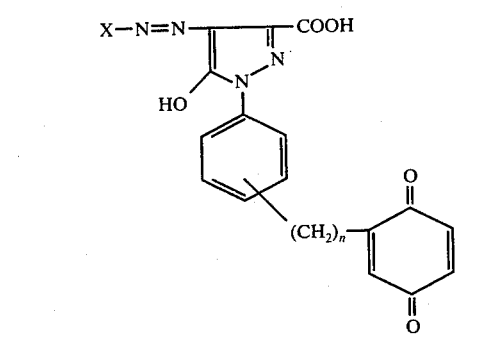

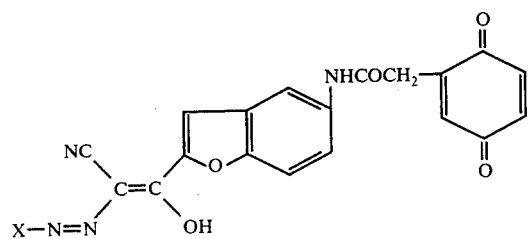

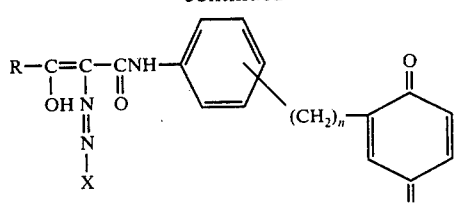

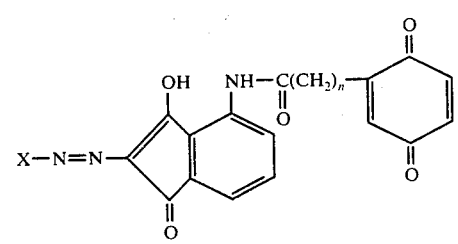

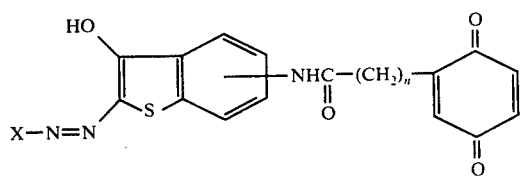

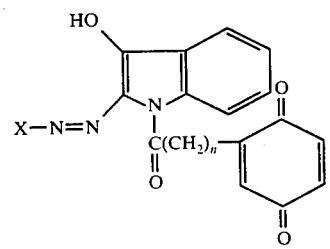

wherein
X represents an aryl group or an aromatic heterocyclic group;
Y represents a methylene group, an ethylene group,

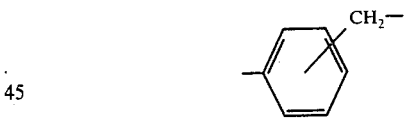

or

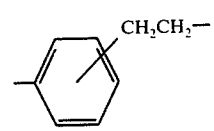

Z' represents hydrogen or an acylamino group;
Z represents an acylamino group;
$Y_1$ and $Y_2$ each represents the same groups as Y;
R represents a lower alkyl group containing from 1 to 6 carbon atoms or a phenyl group; and
n represents 1 or 2.

2. The method of claim 1, wherein
for X, said aryl group is phenyl, tolyl, mesityl, 2 methoxy-4-nitrophenyl or naphthyl and said heterocyclic group is pyridyl or quinolyl;
for Z', said acylamino group is acetylamino or benzoylamino; and for R, said lower alkyl group containing from 1 to 6 carbon atoms is methyl, ethyl, iso-propyl, tert-butyl, pentyl or hexyl.

3. The method of claim 1 wherein said diazonium compound is an azo dye.

4. The method of claim 1 wherein X is phenyl, naphthyl, pyridyl, triazole or a derivative thereof.

5. The method of claim 4, wherein said phenyl for X is substituted at the 2-position with an alkyl group containing 1 to 6 carbon atoms, a halogen atom, a hydroxyl group, or an alkoxy group containing 1 to 6 carbon atoms.

6. The method of claim 4, wherein said phenyl for X is substituted in at least one of the 2-, 4- and 5-positions by the same or different substituents selected from the group consisting of alkyl groups containing 1 to 6 carbon atoms, a sulfo group, alkoxygroups containing 1 to 6 carbon atoms, a hydroxy group, a cyano group, acylamino groups containing 1 to 6 carbon atoms in the acyl moiety thereof, alkylsulfonamido groups containing 1 to 6 carbon atoms in the alkyl moiety thereof, halogen atoms, nitro groups, carboxyl groups, mono-or polycyclic aryl groups, aryloxy groups in which the aryl moiety is mono-or poly-cyclic and arylamino groups in which the aryl moiety is mono-or poly-cyclic.

7. The method of claim 1, wherein said azo dye containing a quinone residue is selected from the group consisting of the following formulae:

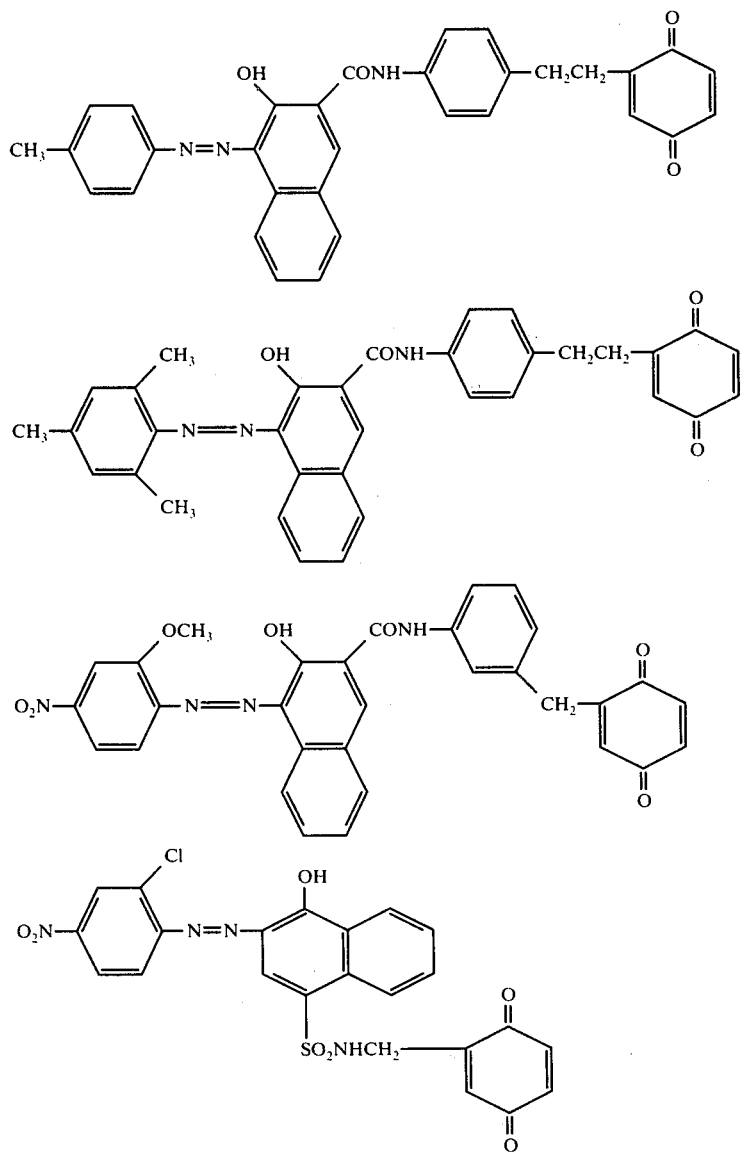

-continued
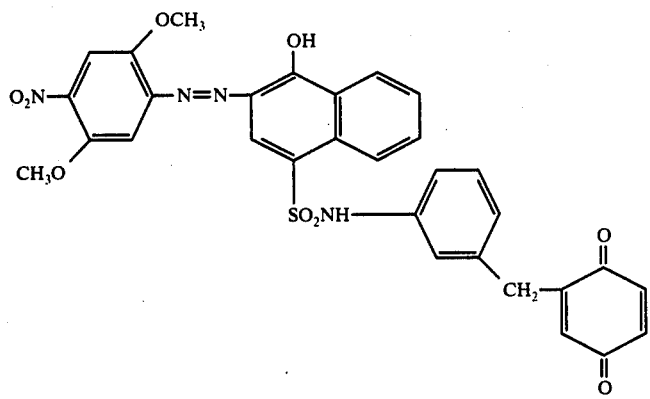
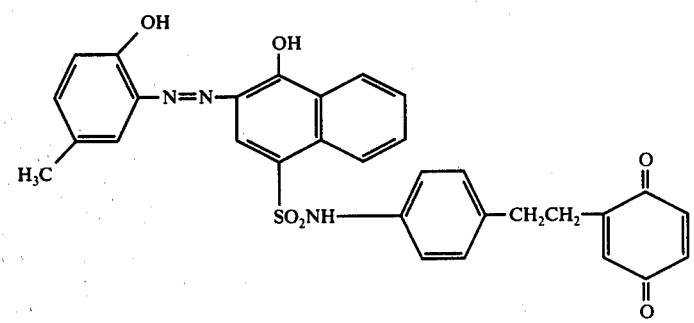
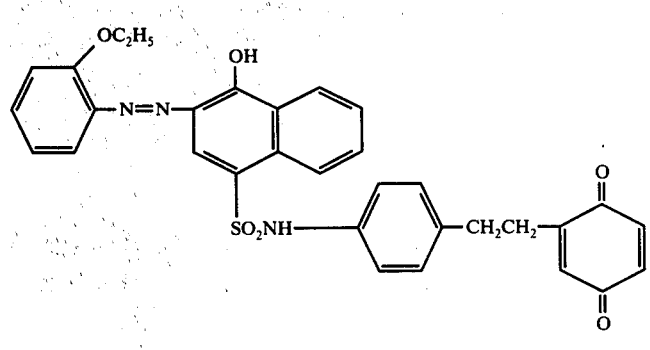
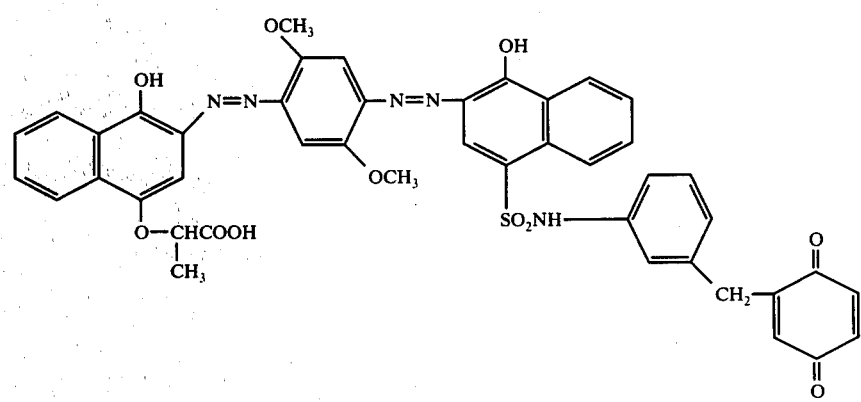

-continued
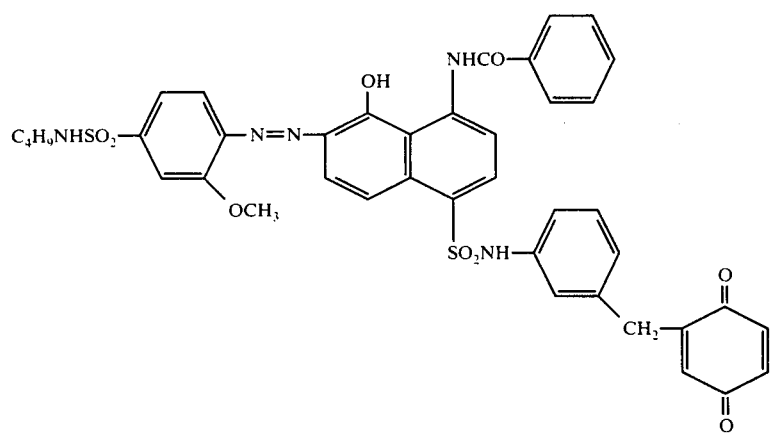
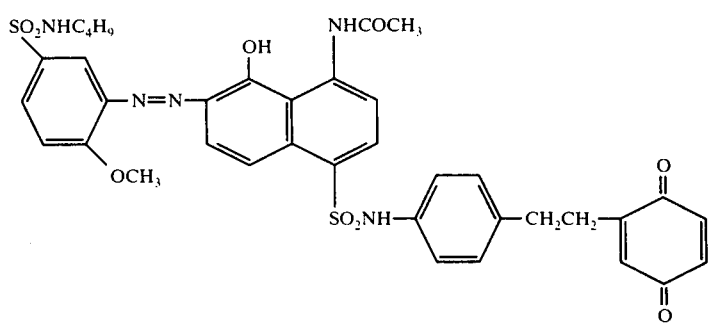
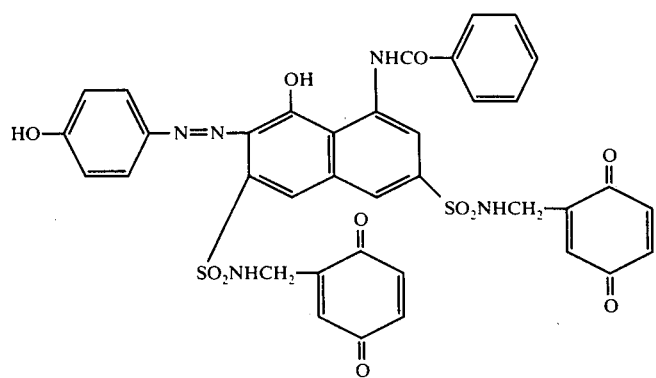
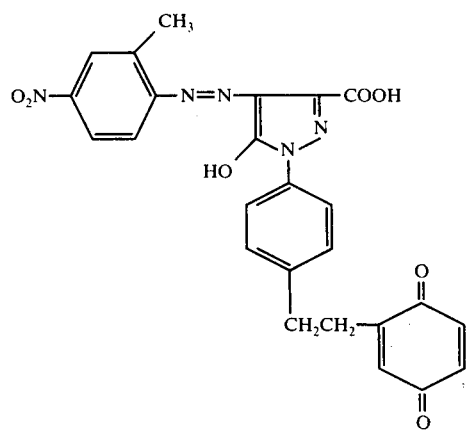

-continued
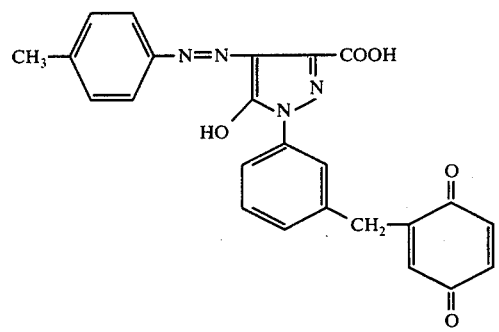
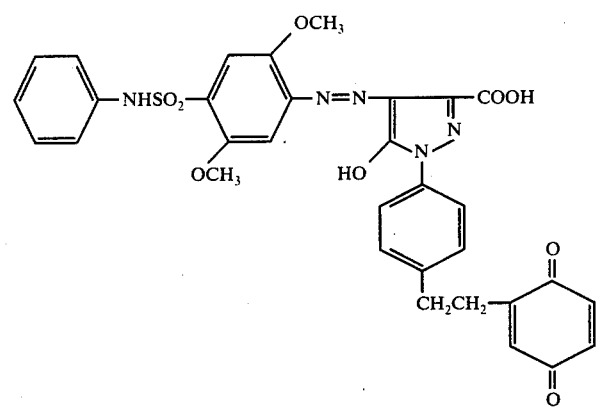
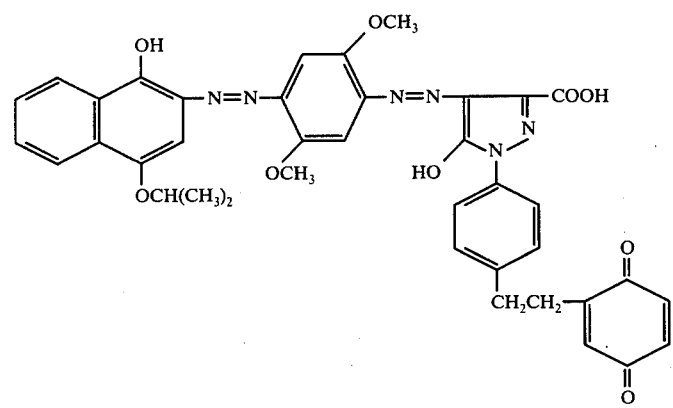
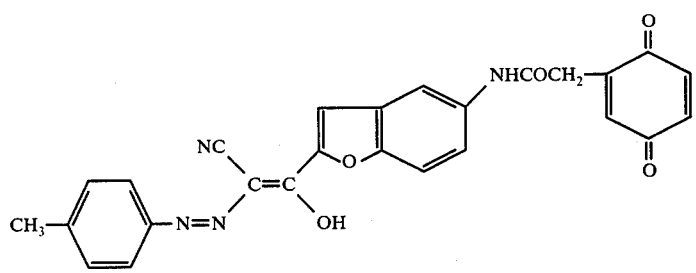
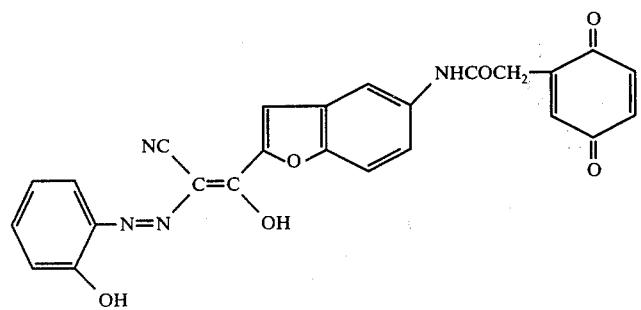

-continued
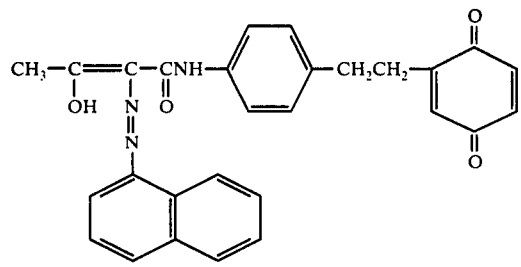
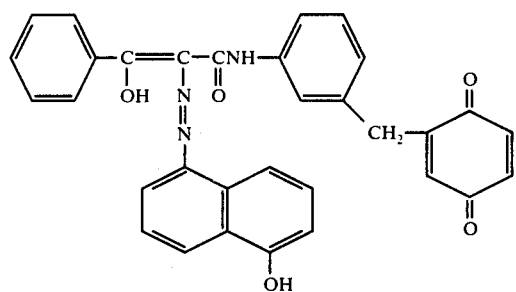
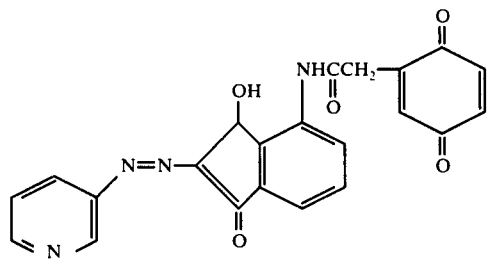
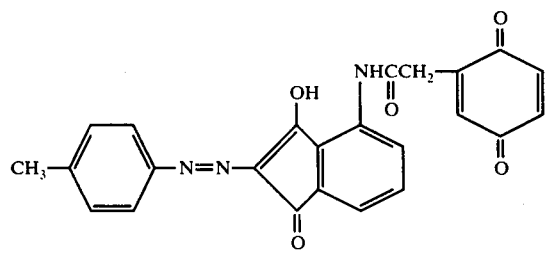
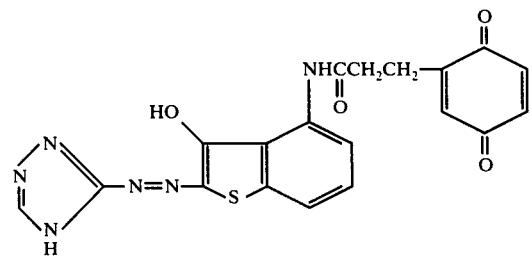
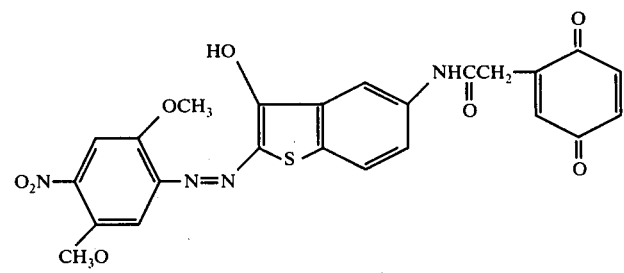
or